United States Patent [19]
Higashi et al.

[11] Patent Number: 5,719,493
[45] Date of Patent: Feb. 17, 1998

[54] ELECTRICAL DEVICE

[75] Inventors: Toshikazu Higashi, Toyokawa; Atsushi Yamaguchi, Aichi-ken, both of Japan

[73] Assignee: Minolta Co., Ltd., Osaka, Japan

[21] Appl. No.: 704,205

[22] Filed: Aug. 28, 1996

[30] Foreign Application Priority Data

Aug. 31, 1995 [JP] Japan ................. 7-223173

[51] Int. Cl.$^6$ ................................... G03G 15/20
[52] U.S. Cl. ................................... 323/908
[58] Field of Search ................. 363/76, 77, 81, 363/84, 125; 323/908

[56] References Cited

U.S. PATENT DOCUMENTS

| | | | |
|---|---|---|---|
| 3,708,720 | 1/1973 | Whitney et al. | 317/13 C |
| 4,001,537 | 1/1977 | Burke et al. | 219/10.55 B |
| 4,171,533 | 10/1979 | Schrader | 361/22 |
| 4,412,277 | 10/1983 | Mitchell | 363/81 |
| 5,132,595 | 7/1992 | Kulka et al. | 315/106 |

FOREIGN PATENT DOCUMENTS

3-102409  4/1991  Japan.
5-188823  7/1993  Japan.

*Primary Examiner*—Matthew V. Nguyen
*Attorney, Agent, or Firm*—McDermott, Will & Emery

[57] ABSTRACT

An electrical device for controlling heater has a power supply connected in parallel with a heater or the like. A reducer such as a resistor is provided for reducing electrical current flowing into the heater. A switch can be operated by a controller to connect the heater to the electrical power supply or to connect the heater and the reducer in series to the electrical power supply. The controller operates the switch to disconnect the heater from the electrical power supply after operating the switch to connect the heater and the reducer in series to the power supply. Thus, even at a timing when the load of the power supply is the maximum and the capacitor charging current to the power supply increases, the change in the current through the heater becomes gradual, and the harmonic components in the current do not increase by using the reducer even if the timing of the maximum load overlaps with the timing of the stop of power supply to the heater.

18 Claims, 7 Drawing Sheets

ELECTRICAL DEVICE

BACKGROUND OF THE INVENTION

1. Field of the Invention

This invention relates to an electrical device for controlling a heater or resistor connected to an electrical power supply.

2. Description of the Prior Art

Harmonic components in a current supplied to an equipment influence an electric power supply thereof or other equipments. Therefore, it is desirable that the harmonic components are small. Recently, there is a tendency that harmonic components are restricted legally. As to an electrophotographic apparatus such as an electrophotographic copying machine, it is a problem to decrease the harmonic components. Especially, it is not easy for a high speed/large-scale apparatus to decrease harmonic components because they increase in proportion to the output capacity of a switching power supply. Harmonics can be reduced by techniques using such as a reactor for smoothing the current waveform or an active filter for waveform shaping. However, the techniques have both merits and demerits about the cost and the performance. A reactor is cheap, but its performance is bad. An active filter has good performance, but its cost is high. At present, by combining these techniques, the level of harmonics is suppressed while the cost is low.

In an electrophotographic recording apparatus, a toner image transferred onto a transfer paper is fixed by a fixing device comprising a fixing roller with a built-in heater. The toner image is fixed by heating by the heater.

At the timings of start and stop of current supply to the heater for fixing, the voltage is changed, and this increases a current flowing to a switching power supply. Then, the harmonic components in the current are increased. In a high-speed apparatus, the harmonic components may exceeds above the restriction value. Especially, when for example a halogen heater is used as the heater for fixing, a rush current becomes larger by a factor of 10 over a regular current. Therefore, it is necessary to suppress these harmonic components.

In the field of electrophotographic copying machine, Japanese Patent laid open Publication No. 10249/1991 describes suppression of the rush current by operating a current reducing means to reduce the current flowing in the fixing heater for a predetermined time at a timing when the fixing heater is turned on. However, the reduction of the harmonic current to the DC power supply connected in parallel with the fixing heater, and improvement thereof are not described. U.S. Pat. No. 4,412,277 describes an AC/DC converter in a power supply wherein a circuit for decreasing harmonics is used to control switching by comparing the input current with an AC voltage (an active filter). If the DC power supply is connected in parallel to a high power load such as a heater, the current distortion may occur when the power supply stops to supply the current to the heater. However, this is not described in U.S. Pat. No. 4,412,277.

A timing of stopping power supply to the heater or the like may overlap a timing of increasing the input current or the load current to the DC power supply. In such a case, harmonic components of the current become large, and it is needed to suppress generation of harmonic components. However, in the above-mentioned prior art techniques, when the two timings overlap each other, the input current to the DC power supply increases more than the rapid current change for the heater, and this causes to increase harmonic components.

SUMMARY OF THE INVENTION

An object of the present invention is to provide an electrical device which suppresses an increase in harmonic components when a current supplied to a resistor changes rapidly.

In an electrical device of the invention, a heater is provided to which electrical current is supplied from an electrical power supply. Further, a reducer such as a resistor is provided for reducing electrical current flowing into the heater. A switch can be operated by a controller to connect the heater to the electrical power supply or to connect the heater and the reducer in series to the electrical power supply. The controller operates the switch to disconnect the heater from the electrical power supply after operating the switch to connect the heater and the reducer in series to the power supply. Thus, even if the timing of the maximum load overlaps with the timing of the stop of power supply to the heater, the change in the current through the heater becomes gradual, and the harmonic components in the current do not increase by using the reducer as a means for reducing the current.

An advantage of the present invention is that harmonic components in the current generated when a current is supplied to the heater can be suppressed, and that the influence thereof on other equipments and the electric power supply system can be made a minimum.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
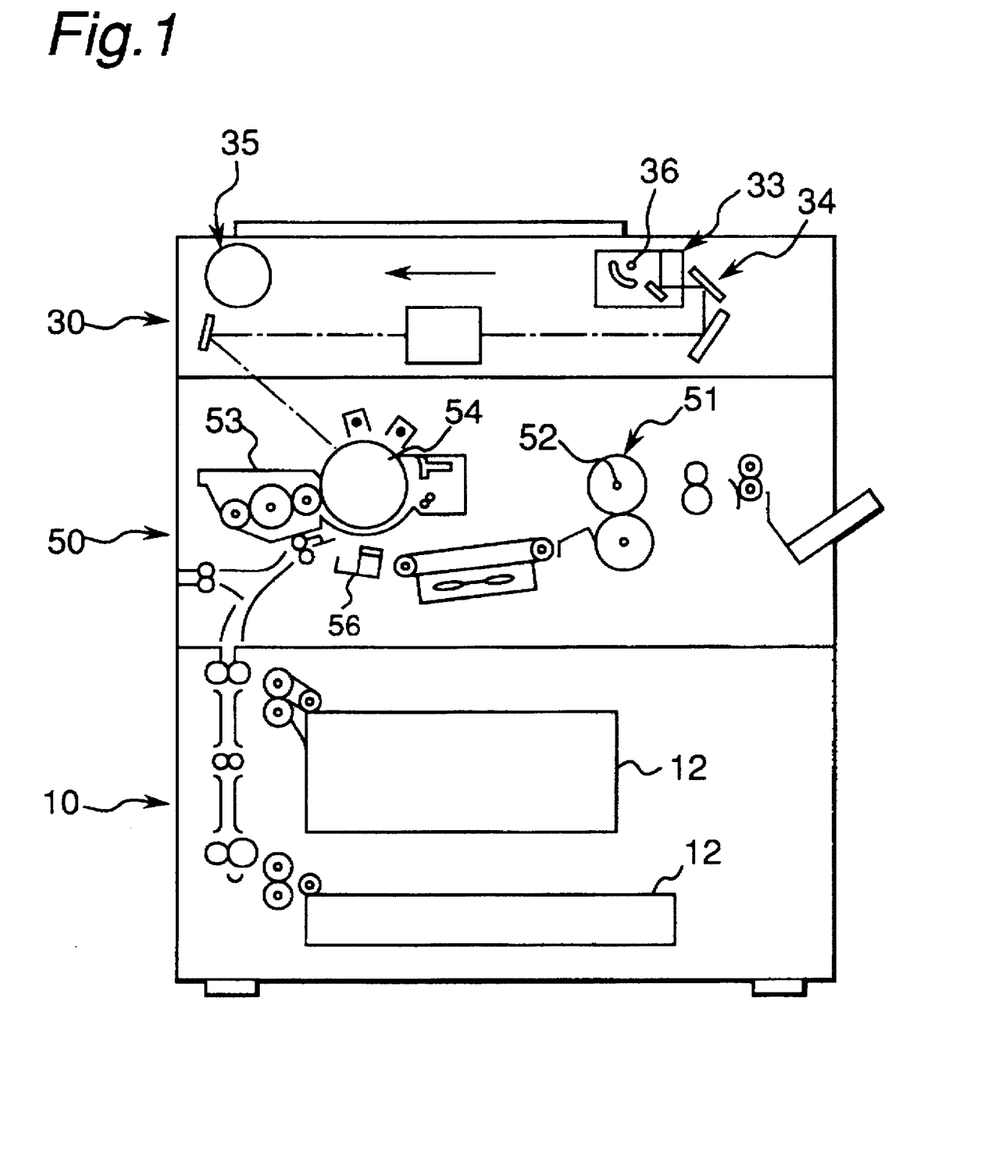
FIG. 1 is a sectional view of the copying machine.

Referring now to the drawings, wherein like reference characters designate like or corresponding parts throughout the views, FIG. 1 shows an electrophotographic copying machine. Similarly to a prior art copying machine, this copying machine comprises a paper feed system 10 for supplying a paper to an image forming system, an optical system 30 for forming a latent image of a document, and the image forming system 50 for forming a toner image on the latent image and for transferring the toner image on a paper.

In the optical system 30, a document put on a platen glass is scanned by an exposure lamp 36 mounted on a slider 33. Mirror 34 are mounted on another slider 34. A document image reflected from the document propagates through an optical system shown in FIG. 1 to be focused on a photoconductor 54 to form a latent image. The slider 33 mounted with the lamp 36 and the second slider with the mirror 34 are driven by a motor 35. In the image forming system 50, a development unit 53 supplied toners to form a toner image on the electrostatic latent image of the document formed on the photoconductor 54. On the other hand, the paper is supplied from either of cassette trays 12 in the paper feed system 10, and from another tray in the image formation system 50, the toner image on the photoconductor 54 is transferred onto the paper by a transfer charger 56. After the transfer, the paper passes between fixing rollers 51 to fix the toner image on the paper. Here, a halogen heater 52 having a tungsten coil therein is set inside the fixing roller 51, and the surface temperature thereof is controlled constantly by controlling the power supply to the tungsten coil in the heater 52.

Figure 2:
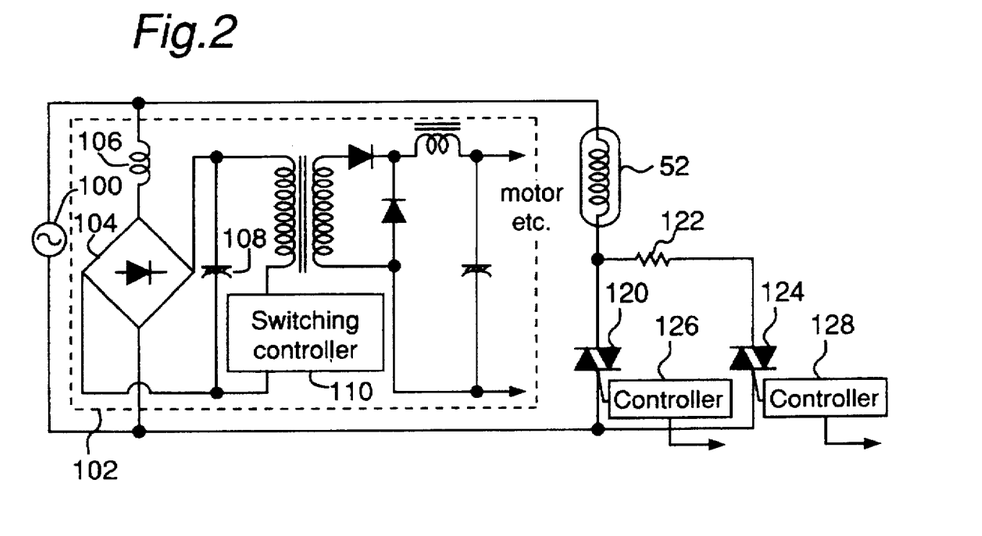
FIG. 2 is a circuit diagram of the fixing heater and the switching power supply part.

FIG. 2 is a circuit diagram of the power supply of the electrophotographic copying machine. In the power supply, a switching power supply 102 with an AC/DC smoothing circuit and a heater 52 for the fixing roller are connected with an external primary power supply 100 in parallel. The heater 52 is usually energized by a first triac 120 to generate heat. Moreover, the heater 52 may also be energized through a resistor 122 by turning on a second triac 124 in order to decrease the current which flows through the heater 52. When the second triac 124 is turned on, the current which flows to the heater 52 can be adjusted by the resistor 122. That is, the resistor 122 operates as a means for reducing the current, and the first and second triacs 120, 124 are switch devices to control whether to use the currant reducing resistor 122 or not. Gates of the triacs 120, 124 are connected to controllers 126 and 128. The operation timing is controlled respectively by the controllers 126, 128 according to control signals received from a CPU 200 (FIG. 4) as will be explained later.

The switching power supply 102 comprises a reactor 106 which suppresses harmonic components and a full-wave rectifier 104 connected in series to the primary power supply 100. A smoothing capacitor 108 is further connected with the full-wave rectifier 104 in parallel. An output voltage smoothed by the smoothing capacitor 108 is subjected to DC/DC conversion by a transformer and a switching controller 110 to generate an output voltage at the secondary side of the transformer to drive loads such as the motor 35 for scanning or a motor (not shown) for driving the photoconductor drum and the like in the copying machine. Here, when the voltage of the capacitor 108 exceeds the charging voltage, a charging current flows for charging into the current in the primary side. Therefore, a current which includes pulse-like peaks or harmonic components flows into the primary side of the switching power supply 102. The peak value of the current as well as the harmonic components increase in proportion to the load current at the secondary side.

Figure 3:
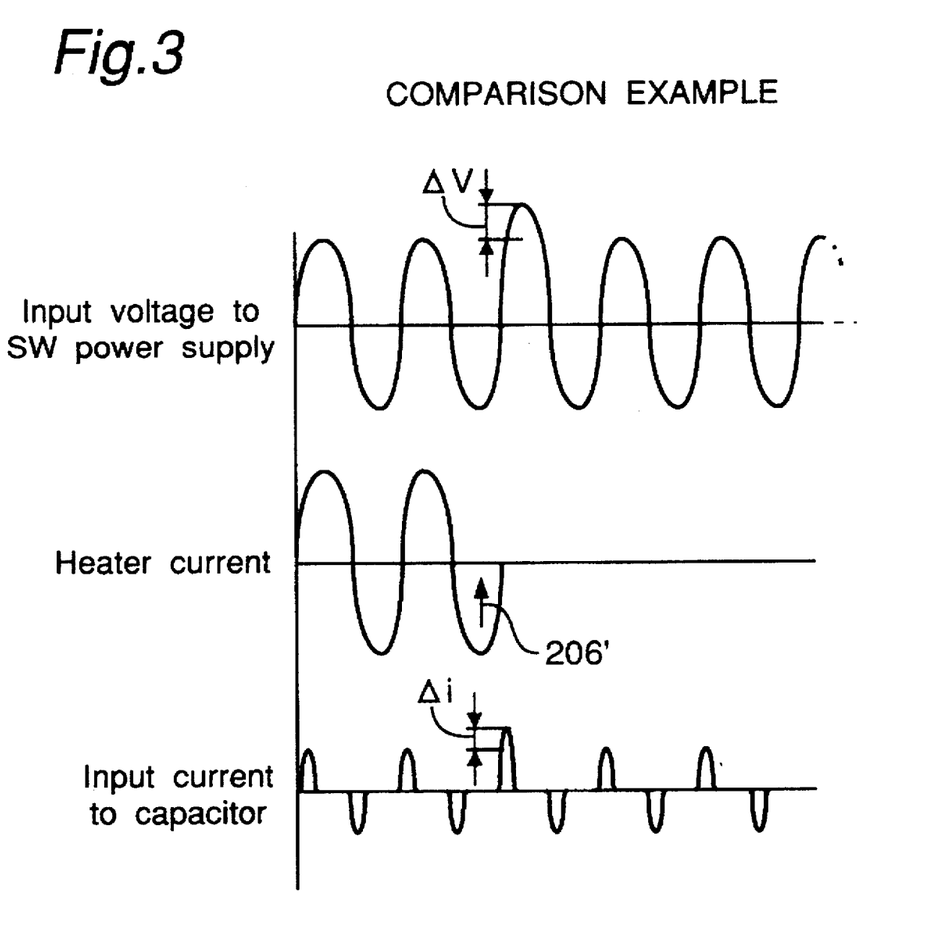
FIG. 3 is a timing chart of a heater control in a comparison example.

As shown in FIG. 2, because the heater 52 of the fixing roller 51 and the switching power supply 102 are connected with the primary power supply 100 in parallel, they affect each other. Especially, because the heater 52 is energized with a large electric power, the input voltage to the switching power supply 102 will be affected by whether the heater is energized or not. Especially, in a case that the input impedance to the primary power supply and the switching power supply becomes high, if the current reducing resistor 122 is not used when the current is controlled to flow through the heater 52 or not, the input voltage at the primary side is changed by a steep change in current. FIG. 3 shows a comparison example of such a case. In this example, the current supply to the heater 52 is stopped at a timing 206' of the switching from the conduction state (On state) to the non-conduction state (OFF state), and the input voltage to the switching power supply 102 increases by ΔV at the timing 206' Then, the charging current to the capacitor in the switching power supply 102 is increased by Δi. Therefore, the largest current will flow at a time when the load for the switching power supply 102 becomes highest.

Then, as will be explained in detail below, a current is flown during a fixed period of time through the current reducing resistor 122 according to the timing at which the heater 52 is switched from the energizing state to the non-energizing state, as will be explained later in detail. As a result, the voltage change becomes smaller, an instantaneous increase in the charging current to switching power supply 102 can be prevented, and the reactor 106 provided to suppress the harmonic components is not needed to be enlarged more than the necessity.

Figure 4:
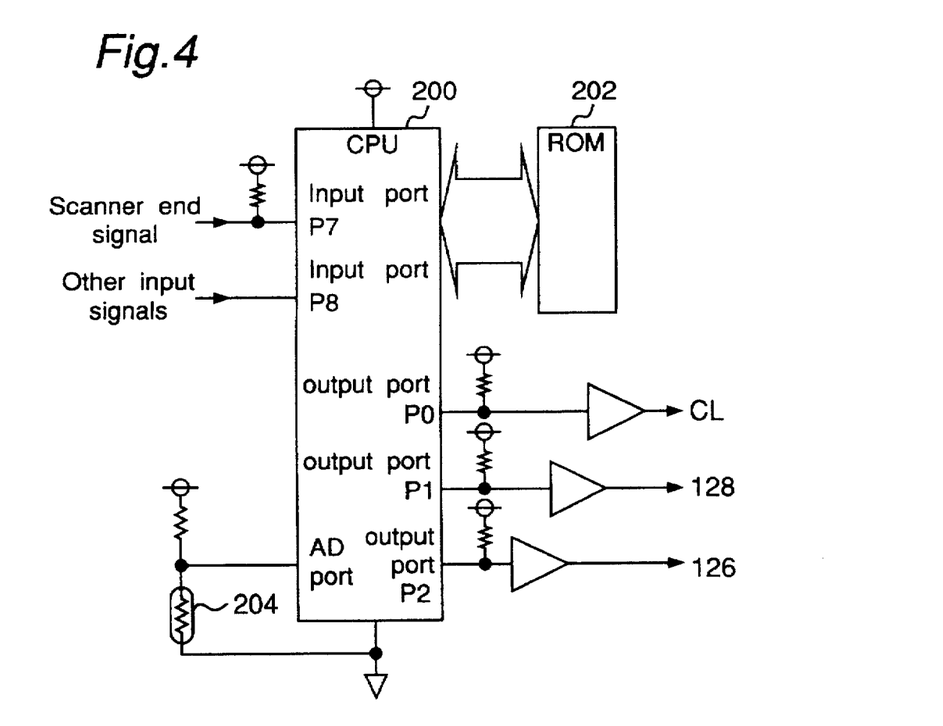
FIG. 4 is a block diagram of a control system of the copying machine.

FIG. 4 shows the CPU 200 which controls the copying machine. The CPU 200 controls the copy operation of the copying machine based on a program stored in a read only memory (ROM) 202 while communicating with another CPU for the display control and a further CPU for the optical system (both CPUs not shown). Operation components provided in the copying machine are controlled through the output ports of the CPU 200 according to input signals such as a scanner end signal received at input ports P7, P8 and an A/D port for analog-to-digital conversion of the voltage from a thermistor 204.

In order to control the heater 52, the surface temperature of the fixing roller 51 is monitored by the thermistor 204. A current is flown through the thermistor 204 attached to the surface of the fixing roller 51, and the voltage of the thermistor 204 is received at the A/D port for an analog-to-digital converter in the CPU 200. The resistance of the thermistor 204 changes with the surface temperature of the fixing roller 51 to change the voltage input to the A/D port. Then, the surface temperature of the fixing roller 51 is monitored by comparing the voltage with a standard value determined beforehand. The CPU 200 controls the current flowing through the fixing heater 52 by outputting a heater remote signal and a reducer remote signal from output ports P1, P2 to a first controller 126 for controlling the conduction state of the first triac 120 and to a second controller 128 for controlling the conduction state of the current reducing resistor 122 for decreasing the current in the heater 52.

In the copying machine, a motor with a DC brush is often used as the motor 35 for the scanning drive. The output current of the switching power supply 102 becomes the maximum at a timing when the optical unit of the slider 33 starts to return from a scanning end position to a scanning start position. The CPU 200 receives a scanner end signal (SCE) from the other CPU that controls the scanning drive of the motor 35. The SCE signal means an end of scanning. Then, a timing that the output current of the switching power supply 102 becomes the maximum can be decided beforehand according to the SCE signal as a time when a predetermined period of time passes after the SCE signal is received.

Figure 5:
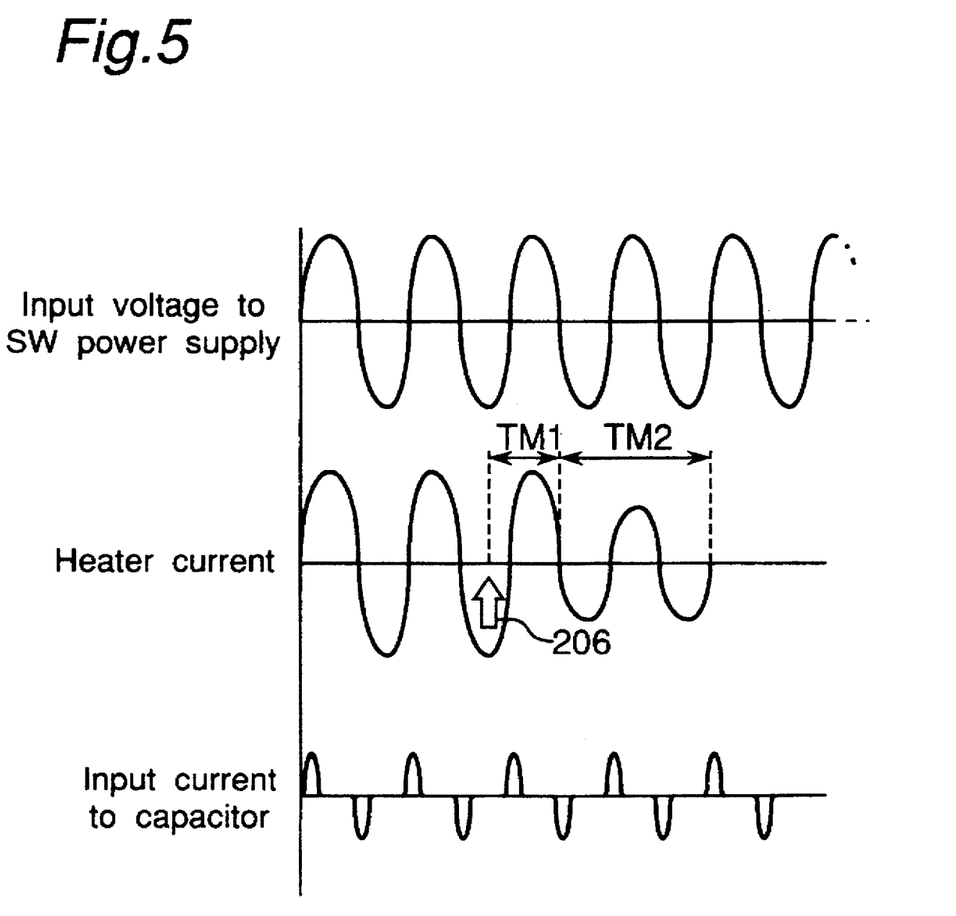
FIG. 5 is a timing chart of heater control.

FIG. 5 is a timing chart for illustrating an example of the heater control of the invention schematically. As shown in the upper portion in FIG. 5, an AC voltage is input from the primary power supply 100 to the switching power supply 102. When fixing is performed, a heater current, shown in the middle portion, is also supplied from the primary power supply 106 to the heater 52. Here, the first triac 120 and the second one 124 are turned on to control the heater current according to three timers, that is, the zeroth, first, and second timers $TM_0$ (not shown in FIG. 5), $TM_1$ and $TM_2$. When the surface temperature T of the fixing roller 52 is lower than the standard value Ta, only the first triac 120 is turned on to energize the heater 52. The zeroth timer $TM_0$ starts counting after a scanner end signal (SCE) is received in order to count a time zone when the load is large (or a time zone until the fixing is completed). When the timer $TM_0$ completes counting, the heater 52 is stopped to be energized. While the timer $TM_0$ is counting, energizing to the heater 52 can be controlled by using the resistor 122 as follows: After the timing when a scanner end (SCE) signal is received or after the load is the largest (refer to an arrow 206), if the surface temperature T of the fixing roller 51 is higher than the standard temperature $T_a$, as in the case shown in FIG. 5, the second triac 124 is also turned on until the first timer $TM_1$ completes counting. That is, both first and second triacs 120 and 124 are turned on. When the first timer TM1 completes counting, the first triac 120 is turned off to the non-conduction state (OFF state). That is, the first timer $TM_1$ operates to absorb only the delay time and the like at the switching in order to reduce surely the current which flows through the heater 52 by the resistor 122. After the first timer $TM_1$ completes counting, the second timer $TM_2$ sets a time zone for supplying the current only through the resistor 122 to the heater 52, that is, a time zone when the second triac 124 is turned on to the conduction state (ON state). Then, the heater current is decreased in the time zone counted by the second timer $TM_2$, as shown in FIG. 5. When the second timer $TM_2$ completes counting, the second triac 124 is turned off to the non-conduction state (OFF state). Because the heater current is changed gradually as explained above, the input current to the capacitor 108, shown at the bottom side in FIG. 5, is not changed largely even for the maximum load to stop the current supply to the fixing heater 52. Thus, the harmonic components in the switching power supply 102 are decreased.

The charging current to the switching power supply 102 increases when the load becomes the maximum. However, by operating the resistor 122 as a current reducing means, the change in the current through the heater becomes gradual as shown in FIG. 5, and a change in the voltage is suppressed. Thus, the harmonic components in the current do not increase even if the timing of the maximum load of the DC current overlaps with the timing of turning on/off of the current flow through the heater 52. On the contrary, if the resistor 122 or the current reducing means 122 is not used or the second triac 124 is not operated when the heater is stopped to be energized (FIG. 3), the AC voltage rises instantaneously due to a rapid current change, and the charging current to the capacitor increases. Then, the harmonic current components increase at the same time.

Though the scanner end signal is used in this embodiment as a base to determine the timing when the output current becomes the maximum, it may be determined at a different appropriate timing. The determination may be performed at two or more timings. Moreover, it is also possible that the output current of the switching power supply 102 can be directly detected by a current detector to control the fixing heater 52 and the resistor 122 according to the detected value.

Next, the heater control of the CPU 200 is explained in detail. The CPU 200 controls the copying machine according to a main routine shown in FIG. 6. First, the random access memory (RAM) and other necessary parts in the control system are initialized at step S2. Next, an internal timer is set at step S4, and heater control to be explained in detail later is performed at step S6 (refer to FIGS. 7A and 7B). Then, processings of other copy operations are executed one by one at step S8. After all the processings are performed, it is decided at step S10 whether the internal timer completes counting. The internal timer counts clock signals of the CPU 200, and a count of a predetermined number of the clock signals is used as the internal timer. When the internal timer is decided to complete counting at step S10, the flow returns to step S2, and the above-mentioned operation is repeated. As a result, the main routine will be operated always in a fixed time, and this operation is used as a standard unit for various timers.

Figure 6:
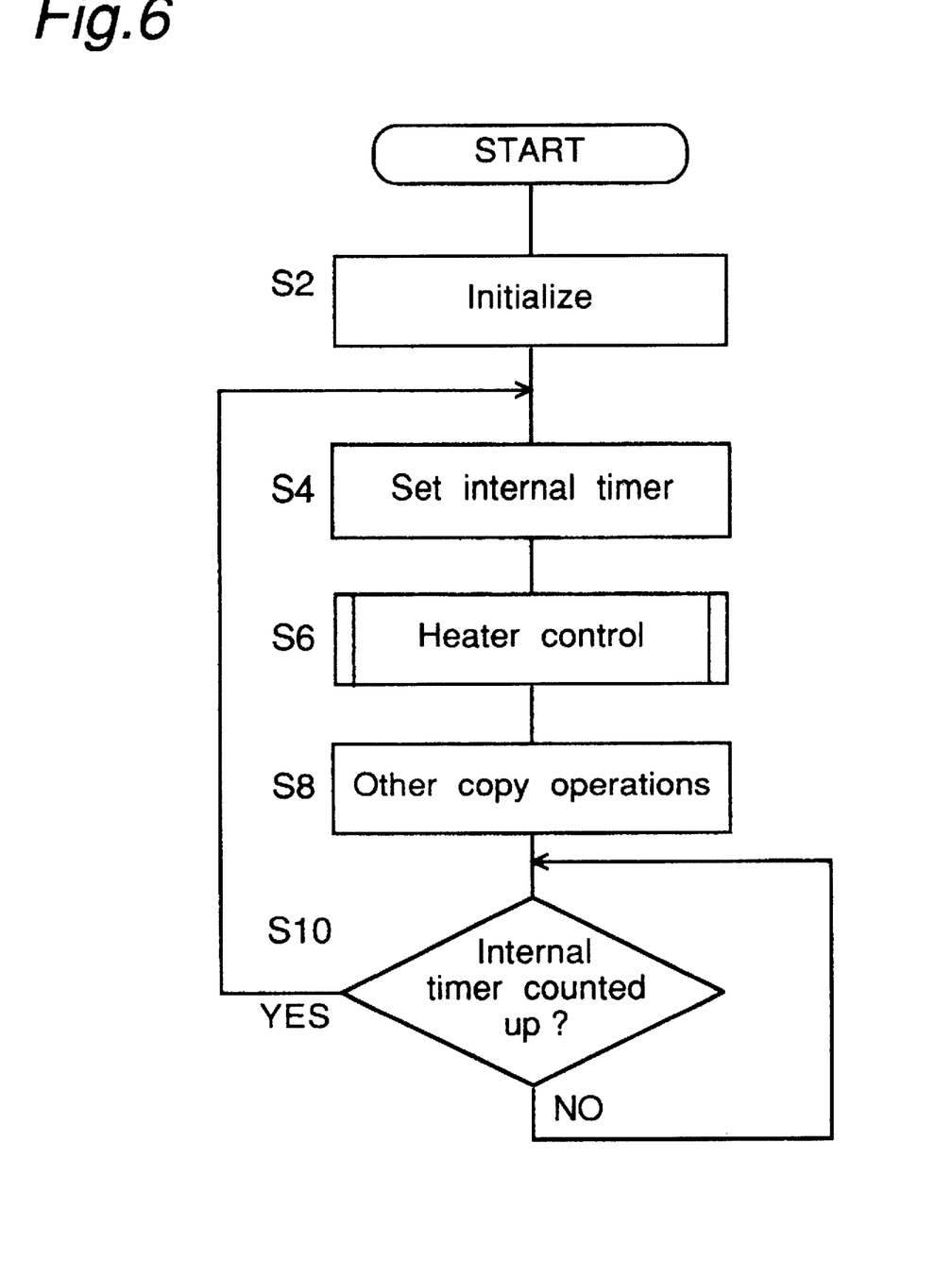
FIG. 6 is a main flowchart of copy control.
Figures 7, 7A:
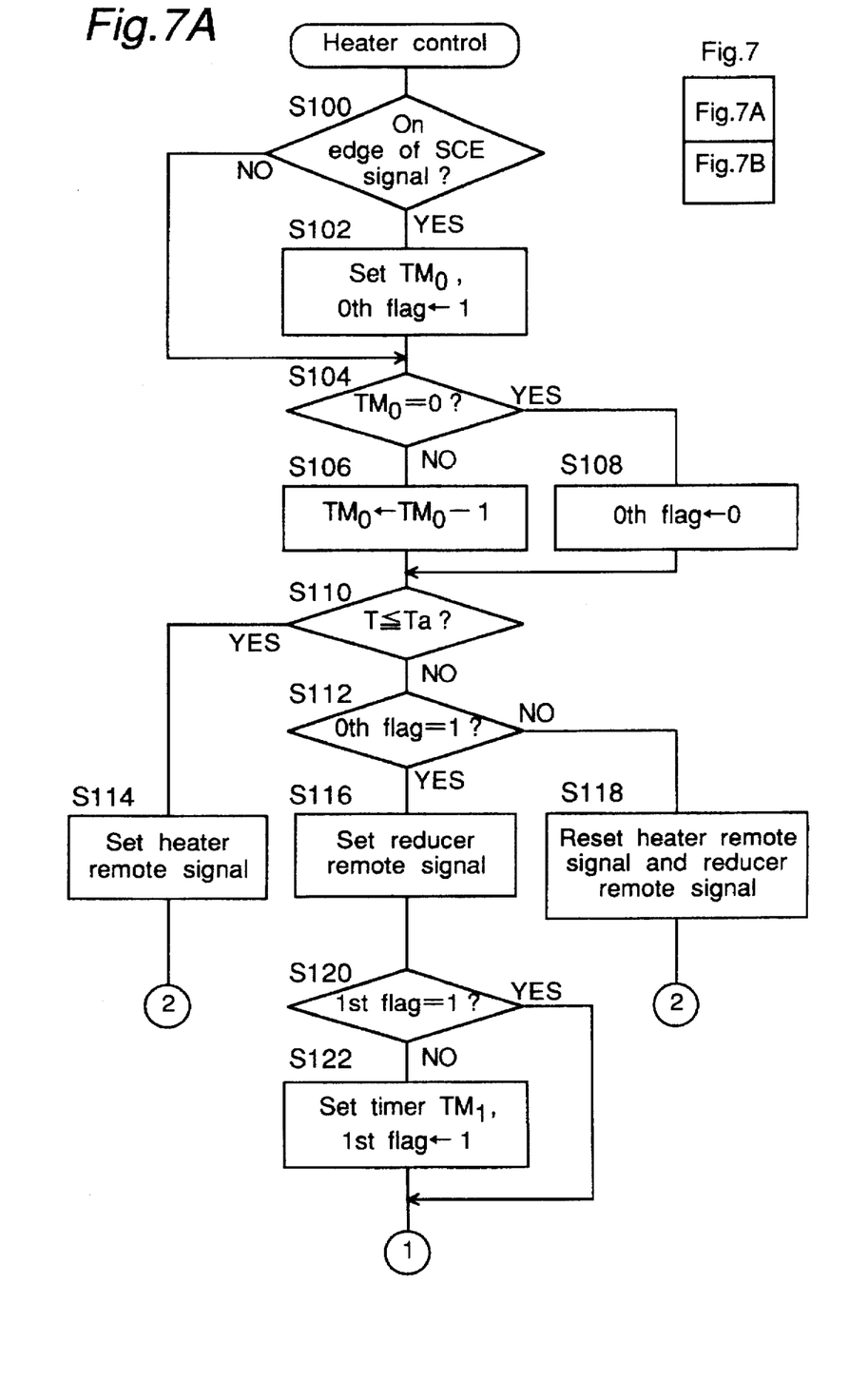
FIGS. 7A and 7B are two parts of a flowchart of the heater control.
Figure 7B:
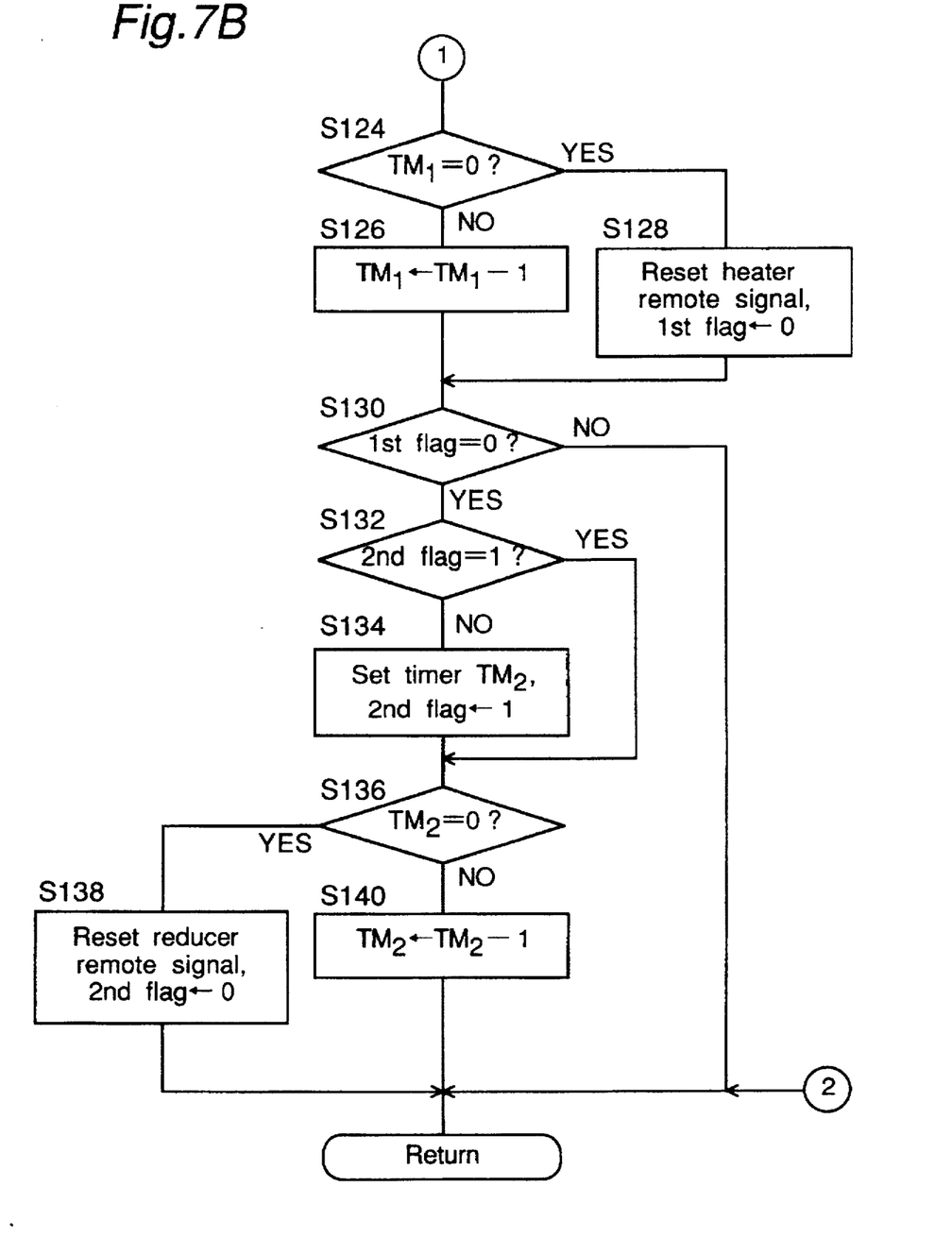

FIGS. 7A and 7B show a flow of the heater control (step S6 in FIG. 6). In this flow, a heater remote signal is set for the first controller 126 for activating the first triac 120 while the first timer $TM_1$ is counting. On the other hand, a reducer remote signal is set for the second controller 128 for activating the second triac 120 while the second timer $TM_2$ is counting. First, it is decided at step S100 whether an on-edge of the SCE signal is detected or not. An "on-edge" means detection of scanner end (SCE) signal. In concrete, it means that the SCE signal is not detected last time but detected this time. When an on-edge of the SCE signal or the maximum load is decided to be detected, the zeroth timer $TM_0$ is set and the zeroth flag is set at "1" at step S102. Next, the zeroth timer $TM_0$ is checked at step S104. On the other hand, if an on-edge is not detected at step S100, the flow advances to step S104 readily to check the zeroth timer $TM_0$.

If the zeroth timer $TM_0$ is decided not to be "0" or it does not complete counting at step S104, the flow advances to step S106, and the zeroth timer $TM_0$ is decreased by one. If the timer $TM_0$ is decided to be "0" or if the zeroth timer $TM_0$ is decided to complete counting at step S104, the zeroth flag is reset (step S108). Thus, the zeroth flag is kept at "1" during a time zone set with the zeroth timer $TM_0$ after the on-edge of the SCE signal is detected. When the zeroth flag is "1", the heater control by using the current reducing resistor 122 becomes possible.

Next, the surface temperature of the fixing roller 51 is checked at step S110. IF the surface temperature T detected according to the voltage of the thermistor 204 is decided to be larger than the standard value Ta (NO at step S110), the flow advances to step S112 to check if the zeroth flag is "1" or not. If the zeroth flag is "1" or if it is a time zone when the current from the power supply to the load is large, the flow proceeds to step S116 to set a reducer remote signal for the controller 128 of the second triac 124. Then, the first flag is checked at step S120. The first flag shows that the first timer $TM_1$ is counting. If the first flag is decided at step S120 not to be "1" (NO at step S120), or if the first timer $TM_1$ is not counting, the first timer $TM_1$ is set at step S122 to start counting, and the first flag is set at "1". It is checked next at S124 whether the first timer $TM_1$ is "0" or the first timer $TM_1$ completes counting. If the first timer $TM_1$ is decided to be counting (NO at step S124), the flow advances to step S126, and the first timer $TM_1$ is decreased by one. While the first timer $TM_1$ is counting, the first and second triacs 120 and 124 are both activated or they are both in the conduction state (refer to steps S114 and S116). However, because most of the current flows through the triac 120, not through the current reducing resistor 122, the current is not changed. That is, though both triacs 120 and 124 are activated when the first timer $TM_1$ is counting, the current does not flow substantially through the resistor 122 for current reducing. On the other hand, if the first timer $TM_1$ is decided to be "0" at step S124 or the first timer $TM_1$ completes counting, the flow advances to step S128. Then, a first heater remote signal for the controller 126 is reset at "0", and the first flag is reset at "0" at step S128.

Next, the first flag is checked at step S130. While the first timer $TM_1$ is counting, the first flag is set at "1". Then, the flow returns readily. On the other hand, if the first flag is decided to be "0" or the timer $TM_1$ completes counting (NO at step S124), the flow advances to step S132 to check whether the second flag is "1" or not. If the second flag is decided not to be "1", the flow advances to step S134 to set the second timer $TM_2$ and to set the second flag. The second timer $TM_2$ is used to set a time zone when the current is supplied to the heater 52 through the resistor 122. The second flag shows the operation of the resistor 122 or the current reducing means. While the first timer $TM_1$ is still operating, the second timer $TM_2$ is not activated.

Next, the second timer $TM_2$ is checked at step S136. If the second timer $TM_2$ is decided not to complete counting at step S136, the second timer $TM_2$ is decreased by one at step S140. If the second timer $TM_2$ is decided to be "0" at step S136, the flow advances to step S138, and a reducer remote signal is reset, and the second flag is reset. Thus, the current is supplied through the current reducing resistor 122 for a predetermined time. Then, the flow returns to the main routine (FIG. 6).

If the fixing temperature T is decided to be equal to or less than the standard value Ta at step S110, the flow advances to step S114 to set a heater remote signal for the controller 126 to heat the fixing heater 52. Then, the flow returns to the main routine.

If the zeroth flag is decided not to be "1" at step S112, it is not a time in the time zone of the maximum load. Then, the reducer remote signal for the controller 128 is reset so as not to turn on the second triac 124 or not to supply the current through the resistor 122. Further, the heater remote signal for the controller 126 is also reset so as not to turn on the first triac 120. Then, the flow returns to the main routine.

In the embodiment described above, the current supply to the heater 52 is stopped after the current is supplied through the resistor 122 to the heater 52 for a predetermined time. In a modified embodiment, a plurality of resistors of different resistances may be provided for current reducing. Then, the current to be supplied to the heater 52 is decreased at a plurality of steps successively before the current supply is stopped completely.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electrical device comprising:
   a heater to which electrical current is supplied from an electrical power supply;
   a reducer for reducing electrical current flowing into said heater;
   a switch operable to connect said heater to the electrical power supply or to connect said heater and said reducer in series to the electrical power supply; and
   a controller which operates said switch to disconnect said heater from the electrical power supply after operating said switch to connect said heater and said reducer in series to the power supply.

2. The heating device as claimed in claim 1, wherein said reducer comprises a resistor.

3. The heating device as claimed in claim 1, wherein said switch comprises a first component and a second component, said first component operable to connect said heater to the power supply, said second component operable to connect said heater and said reducer in series to the power supply.

4. The heating device as claimed in claim 3, wherein each of said first and second components comprises a triac.

5. The heating device as claimed in claim 4, wherein said controller is connected to gates of said triacs.

6. The heating device as claimed in claim 1, wherein said controller operates said switch to disconnect said heater from the electrical power supply when a predetermined period of time passes after said switch connects said heater and said reducer in series to the power supply.

7. An electrical device comprising:
   a heater to which electrical current is supplied from an electrical power supply;
   a load which is connected in parallel with said heater to the power supply;
   a reducer for reducing electrical current flowing into said heater;
   a switch operable to connect said heater to the electrical power supply or to connect said heater and said reducer in series to the electrical power supply; and
   a controller which operates said switch to disconnect said heater from the electrical power supply after operating said switch to connect said heater and said reducer in series to the power supply in a case the electrical current flowing in said load is large.

8. The electrical device as claimed in claim 7, wherein said reducer comprises a resistor.

9. The electrical device as claimed in claim 7, wherein said switch comprises a first component and a second component, said first component operable to connect said heater to the power supply, said second component operable to connect said heater and said reducer in series to the power supply.

10. The heating device as claimed in claim 9, wherein each of said first and second components comprises a triac.

11. The heating device as claimed in claim 10, wherein said controller is connected to gates of said triacs.

12. The heating device as claimed in claim 7, wherein said controller operates said switch to disconnect said heater from the electrical power supply when a predetermined period of time passes after said switch connects said heater and said reducer in series to the power supply.

13. The electrical device as claimed in claim 7, wherein said load comprises a motor.

14. A method for controlling a heater comprising:
   a first step of supplying electrical current to heater;
   a second step of reducing the electrical current supplied to said heater after the electrical current is supplied at said first step; and
   ceasing the supply of the current after the electrical current is reduced at said second step.

15. The method as claimed in claim 14, wherein said third step is executed when a predetermined period of time passes after the current is reduced at said second step.

16. An electrical device comprising:
   a resistor to which electrical current is supplied from an electrical power supply;
   a reducer for reducing electrical current flowing into said resistor;
   a switch operable to connect said resistor to the electrical power supply or to connect said resistor and said reducer in series to the electrical power supply; and a controller which operates said switch to disconnect said resistor from the electrical power supply after operating said switch to connect said resistor and said reducer in series to the power supply.

17. The heating device as claimed in claim 16, wherein said reducer comprises a heater.

18. The heating device as claimed in claim 16, wherein said controller operates said switch to disconnect said resistor from the electrical power supply when a predetermined period of time passes after said switch connects said resistor and said reducer in series to the power supply.

* * * * *

UNITED STATES PATENT AND TRADEMARK OFFICE
CERTIFICATE OF CORRECTION

PATENT NO.     : 5,719,493
DATED          : February 17, 1998
INVENTOR(S)    : Toshikazu HIGASHI et al.

It is certified that error appears in the above-indentified patent and that said Letters Patent is hereby corrected as shown below:

Col. 8,   Line 50, After "to" insert --a--

Col. 9,   Line 5, Delete "heating" and insert --electrical--

Col. 9,   Line 6, Delete "reducer" and insert --resistor--

Col. 10,  Line 1, Delete "heating" and insert --electrical--

Signed and Sealed this

Third Day of November, 1998

Attest:

BRUCE LEHMAN

Attesting Officer     Commissioner of Patents and Trademarks